United States Patent [19]
Kato et al.

[11] Patent Number: 5,945,192
[45] Date of Patent: Aug. 31, 1999

[54] SEALING ASSEMBLY FOR A SOLID POLYMER ION EXCHANGE MEMBRANE

[75] Inventors: Hiroshi Kato, Okayama; Eiichi Torikai, Yao, both of Japan

[73] Assignee: Japan Gore-Tex, Inc., Japan

[21] Appl. No.: 08/963,727

[22] Filed: Nov. 4, 1997

Related U.S. Application Data

[63] Continuation of application No. 08/497,383, Jun. 29, 1995, abandoned.

[51] Int. Cl.$^6$ ................................ B32B 5/14; B32B 5/18; B32B 27/04; B32B 27/08
[52] U.S. Cl. .............................. 428/77; 428/81; 428/195; 428/198; 428/201; 428/304.4; 428/305.5; 428/306.6; 428/308.4; 428/310.5; 428/317.1; 428/317.3; 428/318.4; 428/319.3; 428/421; 428/422; 204/518; 204/520; 204/521; 204/536; 204/630; 204/632; 204/636; 277/945; 277/946
[58] Field of Search .................................. 428/77, 78, 81, 428/79, 195, 198, 201, 304.4, 305.5, 306.6, 308.4, 310.5, 317.1, 317.3, 318.4, 319.3, 421, 422; 204/518, 520, 527, 536, 630, 632, 633; 277/945, 946

[56] References Cited

U.S. PATENT DOCUMENTS

| | | | |
|---|---|---|---|
| 4,056,452 | 11/1977 | Campbell | 204/258 |
| 5,082,472 | 1/1992 | Mallouk et al. | 55/16 |
| 5,547,551 | 8/1996 | Bahar et al. | 204/296 |

FOREIGN PATENT DOCUMENTS

| | | |
|---|---|---|
| 0 183 096 | 6/1980 | European Pat. Off. . |
| 0 186 008 | 7/1986 | European Pat. Off. . |
| 57-134586 | 8/1982 | Japan . |
| 63-233739 | 9/1988 | Japan . |
| 5-174845 | 7/1993 | Japan . |
| 5-75835 | 10/1993 | Japan . |
| 2 013 242 | 8/1979 | United Kingdom . |

*Primary Examiner*—Vivian Chen
*Attorney, Agent, or Firm*—Gary A. Samuels

[57] ABSTRACT

An assembly consisting of at least one seal layer and a solid polymer ion exchange layer wherein the seal layer covers essentially only the region of the ion exchange layer which is to be sealed. The seal layer is made of porous polytetrafluoroethylene film having one surface coated and partially impregnated with a solid polymer ion exchange material. The seal layer provides support and masking functions for the solid polymer ion exchange layer during intermediate manufacturing steps, and reinforcement and effective sealing when assembled in an electrochemical apparatus.

6 Claims, No Drawings

SEALING ASSEMBLY FOR A SOLID POLYMER ION EXCHANGE MEMBRANE

This application is a continuation of application Ser. No. 08/497,383, filed Jun. 29, 1995, now abandoned.

FIELD OF THE INVENTION

The invention relates to solid polymer ion exchange membranes, more particularly to an assembly which provides edge seals or interlayer seals for such membranes in electrochemical apparatus.

BACKGROUND OF THE INVENTION

Electrochemical apparatus such as fuel cells, ozone generators, hydroelectrolysis cells, hydrogen generators, deoxygenation apparatus, and the like are known in the art. Also known, and often used in such electrochemical apparatus, are solid polymer ion exchange membranes, including many in which a fluorine-containing polymer is the solid polymer electrolyte.

In an electrochemical apparatus containing an ion exchange membrane, the ion exchange membrane is typically sealed by sandwiching it directly between gaskets. Positioned on both sides of the membrane are electrodes and, outside the electrodes, collectors and feeders for introduction or removal of fluids in the apparatus.

In an electrochemical apparatus in which is contained a fluorine-containing solid polymer ion exchange membrane, some of the above functions may be combined in a composite ion exchange layer. Such a composite ion exchange layer consists at least of a fluorine-containing solid polymer membrane, and may further consist of electrode and/or catalyst materials coated, deposited, or laminated on the solid polymer membrane. Known methods for producing such composite ion exchange layers include:

(1) Formation of an electrode material on the surface of a fluorine-containing solid polymer electrolyte membrane by vapor deposition, sputtering techniques, or the like.

(2) A method in which an electrode material or precursor is precipitated from an aqueous solution onto the surface of the fluorine-containing solid polymer electrolyte membrane, reduced if necessary, and chemically plated.

(3) A method in which an electrode is formed by hot pressing a catalytic substance, using polytetrafluoroethylene (PTFE) or a solid polymer electrolyte as a binder, onto the surface of a fluorine-containing solid polymer electrolyte membrane.

(4) A method in which a fluorine-containing solid polymer electrolyte membrane is coated with an ink or paste solution, and dried to remove the solvent. The ink or paste can be a mixture of an aqueous dispersion of polytetrafluoroethylene and a catalytic material, or a solution containing a fluorine-containing solid polymer electrolyte and a catalytic material or its precursor.

(5) A method in which a catalyst layer is formed on a collector, and this product is laminated to a fluorine-containing solid polymer electrolyte membrane.

(6) A method in which a sheet-form electrode is first formed from a mixture of polytetrafluoroethylene and a catalytic material. The sheet-form electrode is then laminated to a fluorine-containing solid polymer electrolyte membrane. The electrode can be first coated with a solid polymer electrolyte and laminated to the solid polymer electrolyte membrane using the coating as an adhesive.

Fluorine-containing solid polymer electrolyte membranes are generally strongly acidic, containing sulfonic acid groups, etc., and pose problems with corrosion when in contact with many metals. Additionally, many are quite weak, can be relatively easily torn or cracked, and susceptible to mechanical damage caused by sandwiching and compressing between gaskets, or damaged by local heat generation in an electrochemical apparatus.

In Japanese Laid-Open Patent Application No. 5-174845 is disclosed an ion exchange membrane, a peripheral portion of which is reinforced with a solid polymeric film on both sides and sealed in the reinforced portion by gaskets. However, a problem with this construction is that a secure bond between the ion exchange membrane and the reinforcing film is not always obtained, and failure can occur.

As can be seen from the description above, a number of steps can be required in manufacturing and assembling a composite ion exchange layer containing fluorine-containing solid polymer electrolyte membranes in an electrochemical apparatus. To prepare composite ion exchange layers in which electrode and/or catalytic materials are deposited on and supported by the solid polymer electrolyte membrane generally requires that the membrane be masked so that deposition or plating of material does not occur in the gasket or seal areas, and thus increases the number of manufacturing and assembly steps and, accordingly, the amount of manipulation and handling to which the solid polymer electrolyte membrane is subjected.

It is desirable that a fluorine-containing solid polymer electrolyte membrane be provided with means, early in the manufacturing and assembly process, which reinforces and supports the membrane to minimize damage in handling, can serve as a masking means in certain subsequent manufacturing steps, and further provides a seal for the membrane in an electrochemical apparatus.

SUMMARY OF THE INVENTION

This invention provides an assembly in which a sealing layer comprising a porous polytetrafluoroethylene film is securely adhered to a portion of at least one surface of a fluorine-containing solid polymer electrolyte membrane. The sealing layer provides reinforcement and support to the solid polymer electrolyte membrane, prevents deposition or plating of material in the area of the solid polymer electrolyte membrane it is adhered to, and provides a seal or gasketing surface for the solid polymer electrolyte membrane in an electrochemical apparatus.

"Solid polymer electrolyte" is frequently used herein, for convenience, to mean an ion exchange material made of a solid polymeric material.

The invention is a unitary assembly for sealing a fluorine-containing solid polymer ion exchange membrane in an electrochemical apparatus which can also provide support and masking functions during intermediate manufacturing steps. The assembly comprises an ion exchange layer having opposite facing planar surfaces, and a seal layer, also having opposite facing planar surfaces, adhered to at least a portion of one of the planar surfaces of the ion exchange layer. The ion exchange layer comprises at least a fluorine-containing solid polymer ion exchange membrane.

The seal layer comprises a porous polytetrafluoroethylene film and solid polymer electrolyte, preferably the same solid polymer electrolyte as forms the solid polymer electrolyte membrane. A portion of the solid polymer electrolyte is disposed on the surface of the porous polytetrafluoroethylene film contiguous with the surface of the ion exchange layer, and a portion of the solid polymer electrolyte is penetrated into, but not through, the porous polytetrafluoroethylene film so that the opposite facing surface of the membrane is free of solid polymer electrolyte. The ion exchange layer and seal layer are bonded at their adjoining surfaces by the solid polymer electrolyte.

By porous as used herein is meant a structure of interconnected pores or voids such that continuous passages and pathways throughout a material are provided.

DETAILED DESCRIPTION OF THE INVENTION

The fluorine-containing solid polymer ion exchange membrane for use in the ion exchange layer can be selected from among many perfluoro ion exchange membranes known in the art and commercially available. For example, perfluoro ion exchange membranes sold under the trademark NAFION® manufactured by the DuPont Co. can be used. Selection of the perfluoro ion exchange membrane is made according to its desired function in an electrochemical cell.

Polytetrafluoroethylene is the preferred material for the porous film of the seal layer. Polytetrafluoroethylene is well known as a chemically inert polymer which will not react with ion exchange materials, electrode or catalyst materials, liquid and solid electrolytes, and the like, encountered in electrochemical apparatus environments, nor will it contribute contaminants which can adversely affect such materials. Polytetrafluoroethylene has a very broad service temperature range, from cryogenic temperatures to over 250° C., and, particularly in its preferred porous form, good strength, compressibility, and sealing characteristics. It is, furthermore, hydrophobic and, ever in porous form, resists wetting by water or aqueous solutions.

Porous polytetrafluoroethylene sheet or film suitable for use in the seal layer of the assembly can be made by processes known in the art, for example, by stretching or drawing processes, by papermaking processes, by processes in which filler materials are incorporated with the PTFE resin and which are subsequently removed to leave a porous structure, or by powder sintering processes. Preferably the porous polytetrafluoroethylene film is porous expanded polytetrafluoroethylene film having a structure of interconnected nodes and fibrils, as described in U.S. Pat. Nos. 3,953,566 and 4,187,390. The porous polytetrafluoroethylene film should be at least 5 micrometers thick, preferably in the range of 10 to 500 micrometers thick. The film should have a pore volume in the range of 20 to 95 percent, preferably in the range 50 to 85 percent; and a nominal pore size in the range 0.03 to 3 micrometers, preferably in the range 0.1 to 1 micrometer.

Due to the well known release characteristics of polytetrafluoroethylene, if the pore volume of the porous polytetrafluoroethylene film is less than about 20 percent, or if the nominal pore size is less than 0.03 micrometers, it will be difficult to coat the film and penetrate the pores sufficiently with a solid polymer electrolyte so that the solid polymer electrolyte forms interlocking bonds within the porous structure which are required for securely bonding the film to the solid polymer electrolyte membrane of the ion exchange layer. Consequently, adhesion between the seal layer and ion exchange layer will be poor, and separation of the layers may occur in handling or in service.

On the other hand, if the pore volume exceeds about 95 percent, or if the nominal pore size exceeds about 3 micrometers, the solid polymer electrolyte may penetrate the film excessively, fully occupying the pore volume, and permeating to the opposite side of the porous polytetrafluoroethylene film. This is undesirable in that one surface of the film must be free of solid polymer electrolyte to preserve desired surface and electrical properties, and sufficient pore volume devoid of solid polymer electrolyte must be retained in the film to ensure its sealing function.

The solid polymer electrolyte applied to the porous polytetrafluoroethylene film of the seal layer is preferably the same material as forms the solid polymer electrolyte membrane of the ion exchange layer. The solid polymer electrolyte should be applied to the film surface so that it is less than 100 micrometers thick, preferably 10 or less micrometers thick. It may be possible to apply the solid polymer electrolyte to the porous film solely by hot pressing. However, if only hot pressing is used, very high pressure and heat are required to obtain good joining strength; and, as this can cause the polar groups of the solid polymer electrolyte (such as sulfonic acid groups or carboxylic acid groups) to decompose or undergo other undesirable modification, it is not the method of choice.

A preferred method is to apply the solid polymer electrolyte in solution form, for example, dissolved in an alcohol, to one side of the porous polytetrafluoroethylene film. Care must be taken to avoid excessive penetration of the solution into the porous film which can result in the solid polymer electrolyte being carried through the porous film to the opposite side. The amount of solution penetrated into the film and the depth of penetration can be controlled by adjusting the viscosity of the solution, for example, by raising or lowering the concentration of solid polymer electrolyte in the solution. Alternatively, penetration of the solution can be controlled by including water or other surface tension raising solvent in the solution.

The solution can be applied by conventional coating methods, such as roll-coating, spraying, or the like, so as to form a continuous non-porous film of solid polymer electrolyte on one surface of the porous polytetrafluoroethylene film. It can also be applied to the surface of the porous film in discrete separated spots or lines (including crisscrossing lines) by conventional means such as gravure printing, screen printing, or the like. In either case, a sufficient amount of solution must penetrate into the film to a sufficient depth so that the solid polymer electrolyte, after drying to remove the solvent, forms an interlocking bond with the porous structure of the film. Also, in either case, the amount of solid polymer electrolyte on the surface in the form of a continuous non-porous film, or discrete spots or lines, should be 100 micrometers thick or less, preferably 10 micrometers thick or less. As noted above, none of the solid polymer electrolyte should penetrate through the film to the surface opposite the coated side to ensure that the uncoated surface characteristics remain those of polytetrafluoroethylene only, and sufficient porosity should remain to ensure good sealability.

The material thus formed for the sealing layer is cut to the desired size and shape, placed in the seal areas on one or both sides of the solid polymer electrolyte membrane of the ion exchange layer, with the solid polymer electrolyte surfaces facing each other, and securely bonded to the solid polymer electrolyte membrane by hot pressing at 130° C. and about 3 to 50 kg/cm$^2$ pressure to form the assembly of the invention. The unitary assembly thus formed can be used in an electrochemical apparatus as is, or can be further processed before assembly and use in an electrochemical apparatus.

EXAMPLE 1

An assembly consisting of a sealing layer and a solid polymer ion exchange membrane was made as follows:

A porous expanded polytetrafluoroethylene film (GORE-TEX® expanded PTFE, manufactured by Japan Gore-Tex, Inc.) was used in the sealing layer. The porous PTFE film was about 50 micrometers thick and had a pore volume of about 75%, a nominal pore size of 0.3 micrometers, and a tensile strength of about 0.7 kg/cm.

The porous PTFE film was coated on one side with a solution having a 5% concentration of a fluorine-containing ion exchange polymer (obtained by hydrolyzing a copolymer of $C_2F_4$ and $CF_2=CFO(CF_2)_nSO_2$) in a 1:1 mixture of alcohol and water, after which the coated film was heated and dried to remove the solvent. The dried coating, in the amount of about 0.3 mg/cm$^2$, formed on the porous polytetrafluoroethylene film completed the sealing layer material.

The sealing layer material was placed on a fluorine-containing ion exchange membrane (NAFION® 117 perfluoro ion exchange membrane, manufactured by the DuPont Co.) so as to cover the full surface of the membrane. The sealing layer material was arranged so that the coated surface was in contact with the ion exchange membrane, and the two layers were securely bonded by hot pressing at a temperature of about 130° C. and 3 kg/cm$^2$ pressure to complete the assembly.

The assembly was tested by immersing it in water. The assembly underwent severe curling, with the sealing layer on the inside. When the assembly was forcibly straightened out, the sealing layer did not peel or separate from the ion exchange membrane, indicating that a strong bond between the layers had been obtained. Furthermore, the uncoated side of the sealing layer material resisted wetting by water, forming drops on the surface, indicating that the ion exchange polymer coated on the surface of the porous polytetrafluoroethylene film had not penetrated through the polytetrafluoroethylene film.

Comparative Example 1

A comparative assembly was prepared as described in Example 1, except that a solid non-porous polytetrafluoroethylene film, 50 micrometers thick, was substituted for the porous polytetrafluoroethylene film of the sealing layer material.

The comparative assembly was tested by immersing it in water. The assembly underwent severe curling, with the sealing layer on the inside. When the assembly was forcibly straightened out, the sealing layer peeled and separated from the surface of the ion exchange membrane.

EXAMPLE 2

An assembly consisting of sealing layers adhered to both sides of a composite ion exchange layer was made as follows:

Two washer-shaped rings, 60 mm inside diameter and 120 mm outside diameter, were cut from the sealing layer material of Example 1. A flat disc, 120 mm in diameter, of a fluorine-containing ion exchange membrane (NAFION® 117 perfluoro ion exchange membrane, manufactured by the DuPont Co.) was placed between the rings. The rings of sealing layer material were arranged so that the coated surfaces were in contact with the ion exchange membrane, and securely bonded to the ion exchange membrane by hot pressing at a temperature of about 130° C. and 3 kg/cm pressure to form an assembly.

The assembly was subjected to chemical plating according to the method disclosed in Japanese Laid-Open Patent Application No. 57-134586. In accordance with the above method, the assembly was treated with hydrochloric acid and completely converted into an H$^+$ type, after which a platinum amine complex was adsorbed on to the surface. The platinum amine complex was reduced with sodium borohydride to precipitate the platinum. When additional platinum was grown, using the precipitated platinum as nuclei, the surface of the ion exchange membrane not covered by the sealing layer was uniformly plated with platinum to complete formation of the composite ion exchange layer. The uncoated surfaces of the sealing layers were not plated at all.

The assembly thus obtained was used as the solid polymer electrolyte in a hydroelectrolysis apparatus. When hydroelectrolysis was conducted, with pure water fed to both electrodes, the apparatus operated stably at a current density of 40 Amps/dm$^2$ and a voltage of 2 volts.

This example demonstrates that the sealing layers of the assembly of the invention provided support during formation of the composite ion exchange layer; functioned well as a mask to prevent deposition of platinum on covered areas of the ion exchange membrane; were unaffected by the harsh chemical environments associated with the plating and hydroelectrolysis steps, preserving the electrical insulating properties of the uncoated surfaces; reinforced the ion exchange layer against the compressive force needed for sealing, and provided an effective gas and liquid seal.

We claim:

1. A unitary assembly for use in an electrochemical apparatus, said assembly comprising:

an ion exchange layer comprising a fluorine-containing solid polymer electrolyte membrane, said ion exchange layer having opposite facing planar surfaces; at least one said planar surface having thereon a seal layer, said seal layer disposed so as to cover and adhere to essentially only the region to be sealed of said ion exchange layer;

said seal layer comprising a porous polytetrafluoroethylene film containing an amount of said solid polymer electrolyte, said seal layer also having opposite facing planar surfaces;

a portion of said solid polymer electrolyte disposed on the planar surface of said polytetrafluoroethylene film contiguous with said ion exchange layer, and a portion of said solid polymer electrolyte penetrating into, but not through, said porous polytetrafluoroethylene film so that the opposite facing surface of said porous polytetrafluoroethylene film is free of solid polymer electrolyte;

said ion exchange layer and said seal layer bonded at their adjoining surfaces by said solid polymer electrolyte.

2. The assembly as recited in claim 1 wherein the solid polymer electrolyte of the seal layer is disposed continuously to form a non-porous film completely covering said surface of the seal layer contiguous with said ion exchange layer.

3. The assembly as recited in claim 2 wherein the porous polytetrafluoroethylene film of the seal layer is a porous expanded polytetrafluoroethylene film.

4. The assembly as recited in claim 1 wherein the solid polymer electrolyte of the seal layer is disposed noncontinuously, in spots or lines, over the entirety of said surface of the seal layer contiguous with said ion exchange layer.

5. The assembly as recited in claim 4 wherein the porous polytetrafluoroethylene film of the seal layer is a porous expanded polytetrafluoroethylene film.

6. The assembly as recited in claim 1 wherein the porous polytetrafluoroethylene film of the seal layer is a porous expanded polytetrafluoroethylene film.

* * * * *